United States Patent [19]
de la Puerta et al.

[11] Patent Number: 5,993,713
[45] Date of Patent: *Nov. 30, 1999

[54] REINFORCED COMPOSITE SHAPES AND METHOD AND APPARATUS FOR THEIR MANUFACTURE

[76] Inventors: Enrique de la Puerta, Avda. de Baviera n° 7, 5° Dcha, 28028 Madrid; Juan Manso, Castello n° 84, 4° C-D, 28006 Madrid, both of Spain

[*] Notice: This patent issued on a continued prosecution application filed under 37 CFR 1.53(d), and is subject to the twenty year patent term provisions of 35 U.S.C. 154(a)(2).

[21] Appl. No.: 08/551,403

[22] Filed: Nov. 1, 1995

Related U.S. Application Data

[63] Continuation-in-part of application No. 08/383,704, Feb. 1, 1995, abandoned, which is a continuation of application No. 07/999,775, Dec. 1, 1992, abandoned.

[51] Int. Cl.[6] .................................. B29C 70/52
[52] U.S. Cl. .......................... 264/160; 156/166; 156/180; 264/134; 264/135
[58] Field of Search .................... 264/138, 160, 264/510, 257, 102, 136, 137, 134, 295, 916, 135; 156/166, 180

[56] References Cited

U.S. PATENT DOCUMENTS

| | | | |
|---|---|---|---|
| 1,912,931 | 6/1933 | Clay | 264/258 |
| 2,276,035 | 3/1942 | Guhl | 264/324 |
| 2,308,825 | 1/1943 | Rawlings | 96/26 |
| 3,895,896 | 7/1975 | White et al. | 425/93 |
| 4,030,953 | 6/1977 | Ruthschow et al. | 156/79 |
| 4,167,429 | 9/1979 | Ackley | 156/174 |
| 4,211,591 | 7/1980 | Stiles | 156/83 |
| 4,683,018 | 7/1987 | Sutcliffe et al. | 264/297.8 |
| 4,732,779 | 3/1988 | Towata et al. | 427/57 |
| 4,770,832 | 9/1988 | Okamoto et al. | 264/103 |
| 4,778,638 | 10/1988 | White | 264/160 |
| 4,816,331 | 3/1989 | Rau et al. | 428/294 |
| 4,824,509 | 4/1989 | Tonoki et al. | 156/285 |
| 4,934,100 | 6/1990 | Adell | 49/462 |
| 4,978,360 | 12/1990 | Devanathan | 623/66 |
| 5,084,222 | 1/1992 | Glemet et al. | 264/136 |
| 5,204,033 | 4/1993 | Pearce et al. | 264/138 |
| 5,217,655 | 6/1993 | Schmidt | 264/916 |
| 5,225,020 | 7/1993 | Millett et al. | 156/180 |
| 5,252,054 | 10/1993 | Ehnert et al. | 425/297 |
| 5,294,461 | 3/1994 | Ishida | 427/293 |
| 5,322,582 | 6/1994 | Davies et al. | 156/180 |
| 5,322,661 | 6/1994 | Henrio | 264/510 |
| 5,324,377 | 6/1994 | Davies | 156/180 |
| 5,374,385 | 12/1994 | Binse et al. | 264/136 |
| 5,393,215 | 2/1995 | Donovan, Sr. | 264/257 |
| 5,424,388 | 6/1995 | Chen et al. | 528/73 |
| 5,425,829 | 6/1995 | Chang | 156/175 |
| 5,433,915 | 7/1995 | Yamamoto et al. | 264/510 |
| 5,462,618 | 10/1995 | Rogers et al. | 156/161 |
| 5,470,517 | 11/1995 | Conley | 264/137 |
| 5,492,755 | 2/1996 | Binse et al. | 428/294 |
| 5,540,797 | 7/1996 | Wilson | 156/180 |
| 5,545,297 | 8/1996 | Andersen et al. | 264/102 |
| 5,556,496 | 9/1996 | Sumerak | 156/166 |
| 5,626,700 | 5/1997 | Kaiser | 156/180 |
| 5,632,838 | 5/1997 | Weidner | 156/180 |
| 5,650,224 | 7/1997 | March et al. | . |
| 5,658,519 | 8/1997 | March et al. | . |

FOREIGN PATENT DOCUMENTS

| | | | |
|---|---|---|---|
| 0 274 707 | 7/1988 | European Pat. Off. | 264/265 |
| 2 558 102 | 1/1985 | Germany | 264/265 |
| 1166936 | 6/1989 | Japan | 264/257 |
| 544885 | 5/1942 | United Kingdom | 264/257 |

*Primary Examiner*—Mathieu D. Vargot
*Attorney, Agent, or Firm*—Ostrolenk, Faber, Gerb & Soffen, LLP

[57] ABSTRACT

Reinforced composite shapes and a method and an apparatus for the production of the reinforced composite shapes. Reinforcement elements such as steel rods, reinforcement fibers and resin are fed into a mold. The reinforcement elements are straightened, aligned and oriented before introduction into the mold.

19 Claims, 10 Drawing Sheets

FIG. 10 ific Ser. No.
08/383,704 filed Feb. 1, 1995, now abandoned, which is a
Continuation of application Ser. No. 07/999,775 filed Dec.
1, 1992, now abandoned.

BACKGROUND OF THE INVENTION

The present invention relates to reinforced composite shapes comprising reinforcement elements, reinforcement fibers, and resin, and to a method and apparatus for manufacturing the reinforced composite shapes.

It relates more particularly to reinforced composite shapes comprising steel rods as reinforcement elements. The steel rods are straightened, aligned and oriented before being introduced into a mold for forming the reinforced composite shapes.

Reinforced composite shapes are conventionally manufactured by impregnating reinforcement fibers with a resin in a bath or by injecting resin into a mold. The composite shapes are then formed in a mold by shaping and polymerizing the impregnated fibers. For example, in the pultrusion process, reinforced composite shapes are manufactured in continuous lengths by pulling resin impregnated reinforcement materials through a forming and curing die, known as a pultrusion mold.

Background pultrusion-type processes are disclosed in EP-A-274,707, JP-A-1-166,936, and FR-A-2,558,102, the disclosures of which are incorporated by reference.

Prior art composite shapes, however, are not suitable for structural applications that require a high modulus of elasticity and stress intensity factor. For example, it has been found that prior art composites cannot be used to replace steel pillars, beams, etc., because typically the known composites have a lower modulus of elasticity and stress intensity factor than the steel pillars, beams, etc., that they would replace.

SUMMARY OF THE INVENTION

An object of the present invention is to provide improved, stronger reinforced composite shapes of any desired cross-section, which can be manufactured more easily and at less expense than traditional structural shapes.

A further object of the invention is to provide a method of manufacturing reinforced composite shapes, as well as an apparatus for carrying out the method.

These and other objects of the invention are achieved by reinforced composite shapes that have reinforcement elements extending longitudinally through the shapes, providing peripheral reinforcement. The reinforcement elements are completely enclosed within the composite material and are thereby completely protected against corrosion. The composite shapes have a high elastic limit, i.e., stress intensity factor, and high modulus of elasticity. They are usable to manufacture large structural pieces such as beams and posts, as large as 60 cm in width and 17 m in length, for example.

DESCRIPTION OF PREFERRED EMBODIMENTS

Although preferred embodiments employing steel reinforcement elements are described herein, the present invention is not limited to the use of steel. Reinforcement elements of other suitable materials may also be used in the practice of the invention.

Figure 1:
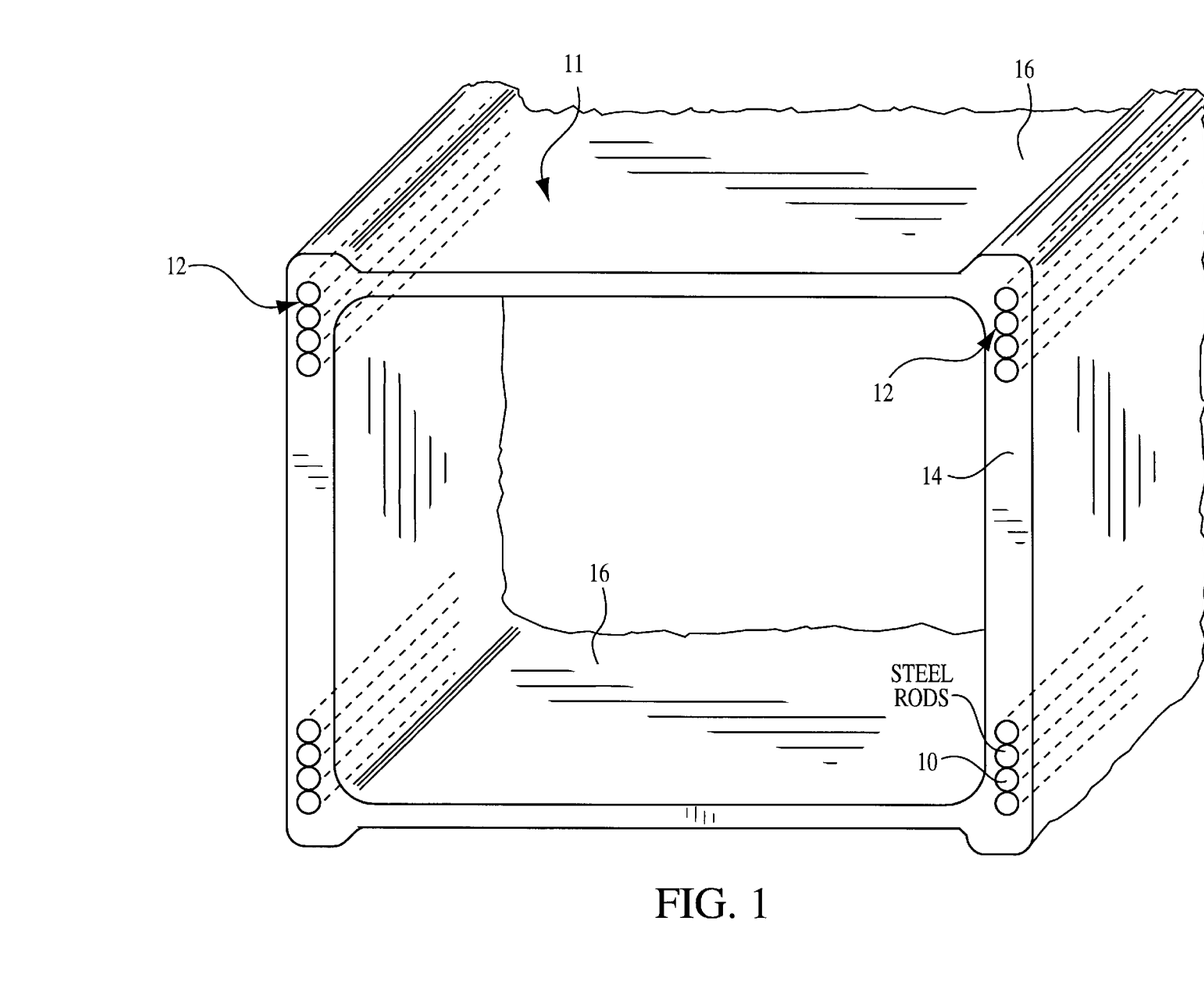
FIG. 1 is a perspective view of one example of a reinforced composite shape with a closed cross-section.
Figure 2:
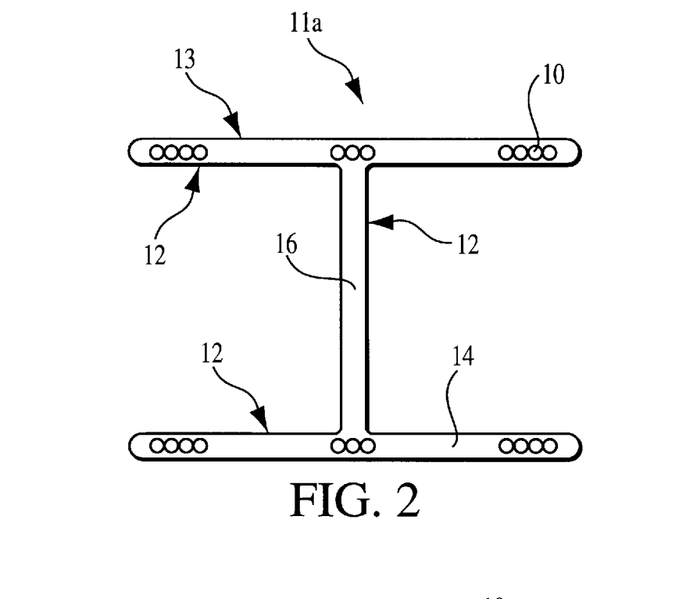
FIGS. 2 and 3 are cross-sectional views showing other examples of reinforced composite shapes with open cross-sections.
Figure 3:
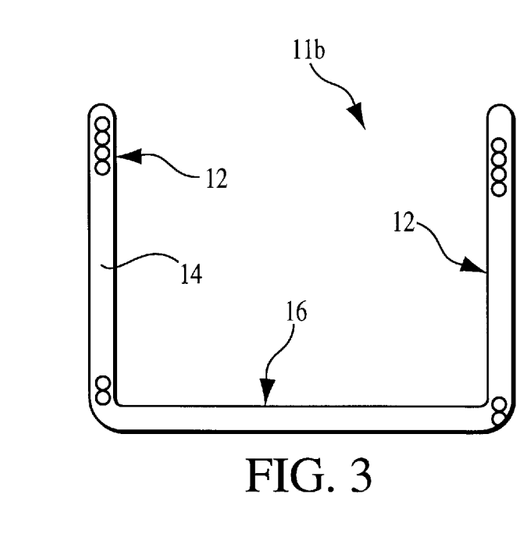

FIGS. 1 to 3 show examples of reinforced composite shapes 11, 11a and 11b that can be produced by the present invention. FIG. 1 shows a closed rectangular shape and FIGS. 2 and 3 show open H-shaped and U-shaped cross-sections, respectively. Each composite shape has a plurality of reinforcement elements 10 that extend longitudinally through the composite shape and are oriented relative to each other in accordance with the cross-sectional shape of the reinforced composite shape. Each composite shape also includes a matrix 14 of resin and reinforcement fibers. The reinforcement elements 10 are embedded in the matrix 14.

The number and orientation of the reinforcement elements are determined on the basis of the composite shapes that are to be formed, i.e., the number and orientation of the reinforcement elements are specific to the particular reinforced composite shapes that are to be formed, the intended use of the reinforced composite shapes, and the structural characteristics that are desired for the composite shapes. The reinforcement elements 10 are arranged so that they are surrounded by resin material.

For example, the reinforcement elements 10 of the reinforced composite shape 11 of FIG. 1 are oriented and stacked so as to form two mutually parallel stacks 12 of reinforcement elements. Only the reinforcing elements at the top and bottom of each stack are shown in FIG. 1. Each stack 12 has a predetermined number of reinforcement elements 10. Each reinforcement element 10 in each of the stacks 12 is positioned so as to be close to or preferably in contact with adjacent reinforcement elements, and is oriented relative to the other reinforcement elements so as to be substantially straight. The reinforcement elements 10 are embedded completely in the matrix 14 and do not have any portions exposed. They are preferably precut to be slightly shorter than the length of the shape so that their ends can be completely enclosed. They are preferably as close to the center of the matrix as possible. Central webs 16 interconnect the stacks 12. Although the central webs 16 have no reinforcement elements in these embodiments, they could be provided with reinforcement elements if desired.

Variations in the orientation of the reinforcement elements with respect to one another, or reinforcement elements that are not substantially straight along the lengths of the reinforced composite shapes, could cause defects in the reinforced composite shapes that are formed. In particular, such variations could cause portions of the reinforcement elements to be exposed. Exposure of the reinforcement elements could cause the reinforced composite shapes to be less resistant to corrosion, and other undesirable effects such as less rigidity. In particular, since reinforced composite shapes are frequently used in high stress applications and corrosive environments, it is preferred that the area exposed of the reinforcement elements be minimized.

Since the resin forming the matrix of the composite shapes is expensive, the quantity that is used is strictly controlled. The thickness of the resin surrounding the reinforcement elements is such that the resin surrounds the reinforcement elements and binds the materials in the composite, but excess resin need not be used to compensate for variations in the orientation of the reinforcement elements or to compensate for variations resulting from the reinforcement elements not being straight.

The reinforcement elements preferably form a high percentage of the cross-section of the composite shapes, at least about 5% and up to approximately 40%. It has been found that less than 5% of steel is not useful to add strength, while more than 40% is not advisable as there would be too little composite surrounding the steel, for example as little as 2.5 mm, and it would not hold. Advantageously, the reinforcement elements constitute about 32% to 35% of the total cross-section of the composite shapes. These cross-sectional percentages of the reinforcement elements have been found advantageous to obtain the desired technical improvements in the composite shapes that are formed.

By weight, the normal composition of the shapes may be about 55% steel rods, about 30% fiber reinforcement, and about 15% resin matrix.

It has been found that the rigidity of the composite shapes that are obtained by the present system is remarkably increased by three times by the use of steel reinforcement elements and glass fiber embedded in the resin matrix. The reinforcement elements have a high elastic limit, i.e., the maximum stress the elements can sustain without permanent deformation. The present inventors have found that the use of steel rods as the reinforcement elements is preferable, for reasons of both strength and economy. It has been found that with steel rods the composite shapes have Young's modulus (modulus of elasticity) of 900,000 to 1,000,000 Kg/cm$^2$, while the modulus with pultruded composite material and glass fiber alone would be only about 300,000–340,000 Kg/cm$^2$ with a thickness greater than 10 mm, or about 240,000 kg/cm$^2$ with a thickness between 5 and 10 mm. Without the use of the pultrusion process, the Young's modulus would only be about 50–70% of the preceding figures. An advantage of the increase in Young's modulus is that distortion magnitudes are reduced to a third of those found in prior art composites, which makes the reinforced composite shapes suitable for the uses mentioned above.

Figure 4:
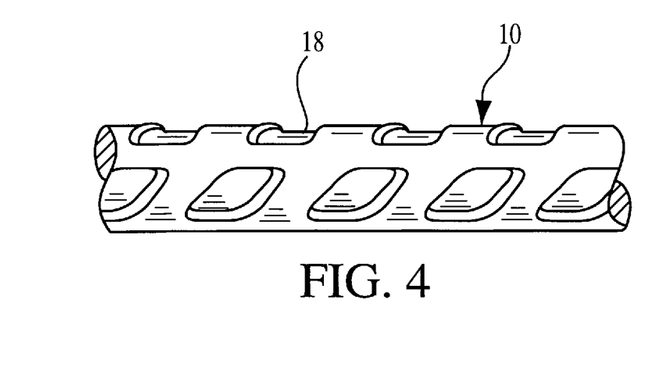
FIGS. 4 and 5 are perspective and cross-sectional views, respectively, of a steel reinforcement element.
Figure 5:
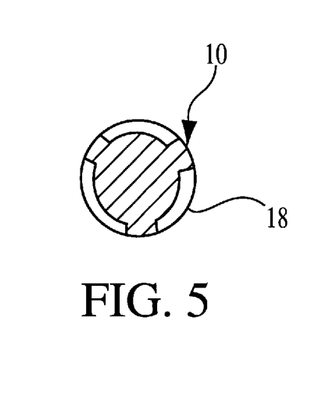

Preferably, steel rods having an indented surface, as shown in FIGS. 4 and 5, are used as the reinforcement elements. The indented surface 18 of the steel rods provides a strong bond with the other materials of the composite, especially in response to the expansion of the steel and corresponding contraction of the resin due to the elevated temperature in the mold.

The invention can be practiced with some of the stronger steels normally used in building works (pillars, beams, bridges, etc.) having the values specified by DIN 17100, as follows:

| Type  | % Carbon  | Elastic Limit       | Breaking Load       |
|-------|-----------|---------------------|---------------------|
| ST-34 | 0.15–0.17 | 20 kg/mm$^2$        | 34 kg/mm$^2$        |
| ST-37 | 0.17–0.20 | 24 kg/mm$^2$        | 37 kg/mm$^2$        |
| ST-42 | 0.22–0.25 | 26 kg/mm$^2$        | 42 kg/mm$^2$        |
| ST-50 | 0.25–0.35 | 30                  | 50–60               |
| ST-60 | 0.35–0.45 | 34                  | 60–70               |
| ST-70 | 0.55–0.75 | 37                  | 71–81               |

For some applications, an elastic limit of at least about 5500 kg/cm$^2$ or as low as at least about 2750 kg/cm$^2$ is appropriate.

For some applications of the present invention, however, the carbon ratio of the steel is preferably more than about 0.40%–0.50%. Particularly for pylons for electric power lines, the steel rods preferably have an elastic limit of at least about 8500 kg/cm$^2$, in order to reduce the necessary cross-sectional thickness of the shapes to be manufactured.

The steel rods are advantageously about 6–10 mm, preferably 8 mm in diameter. They are preferably stress relieved as provided by ASTM standard A-421 so as to avoid deformation when cut.

The technical requirements of two types of steel rods that are preferably used are given below per ASTM standards and the Spanish standard UNE 36-095-85:

| % Carbon  | Elastic Limit       | Breaking Load        |
|-----------|---------------------|----------------------|
| 0.60–0.75 | 85 kg/mm$^2$        | 100 Kg/mm$^2$        |
| 0.80–0.86 | 132.5 Kg/mm$^2$     | 157 Kg/mm$^2$        |

The characteristics of these preferred steels are greater than those of the conventional steels listed above.

Known thermosetting resins may be used as the matrix of the reinforced composite shapes. Examples of such resins include polyester, vinyl ester, epoxy and acrylic.

The reinforcement fibers will be about 30–50 percent of the total volume of the composite.

Known reinforcement fibers may be used in the composite shapes including chopped strand mat, continuous mat, roving glass, woven equilibrated (0° to 90°), preferably, web woven 80° to 90°, surface veil, and combinations of carbon and aramid with glass fibers.

To provide these high cross-sectional percentages of reinforcement material, the use of a continuous, automatic system for cutting and feeding the steel material to the manufacturing process has been found to be important. The manufacturing system will now be described.

Figure 6A:
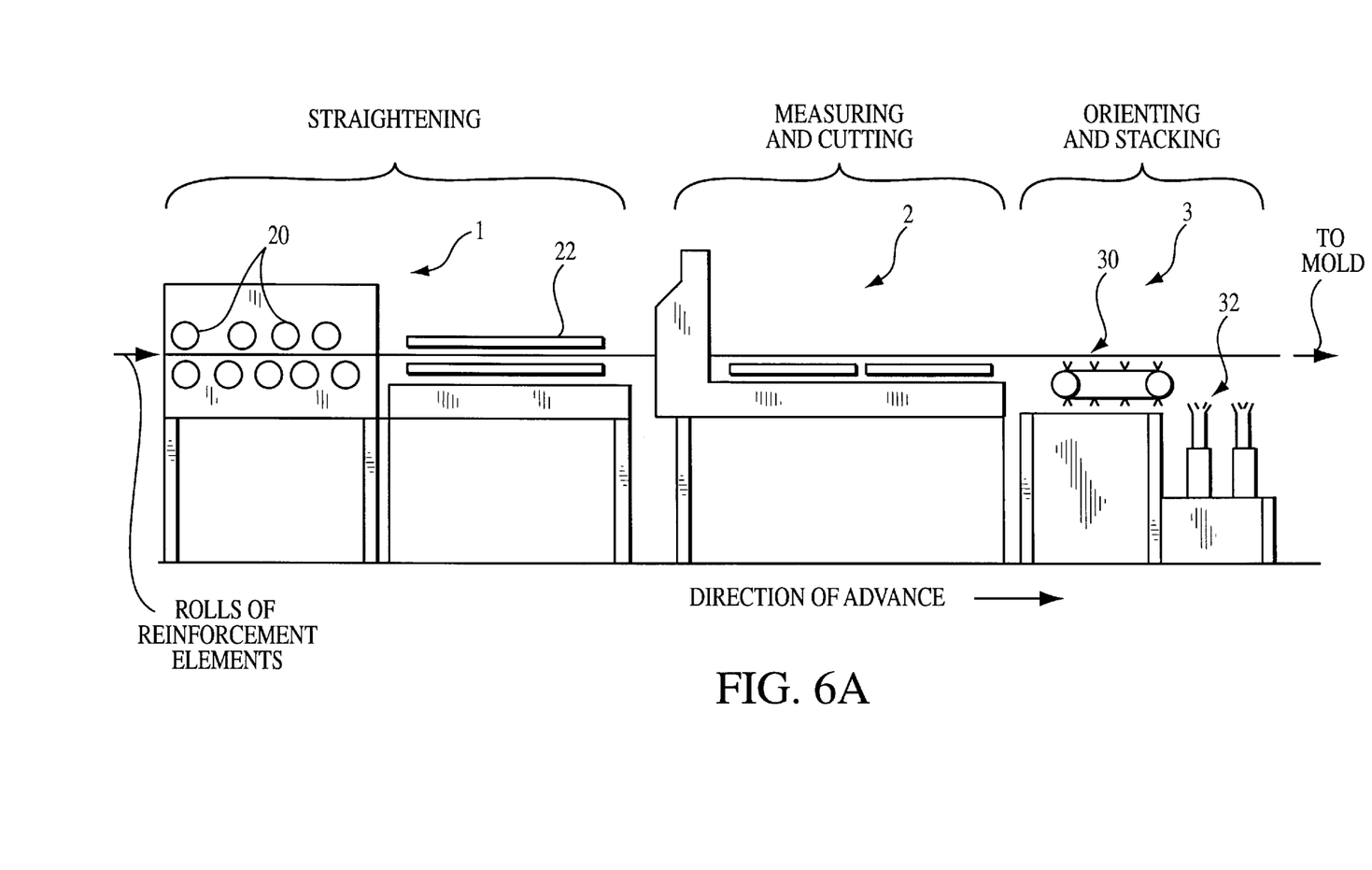
FIGS. 6A and 6B show schematically a preferred embodiment of an apparatus for manufacturing reinforced composite shapes.
Figure 6B:
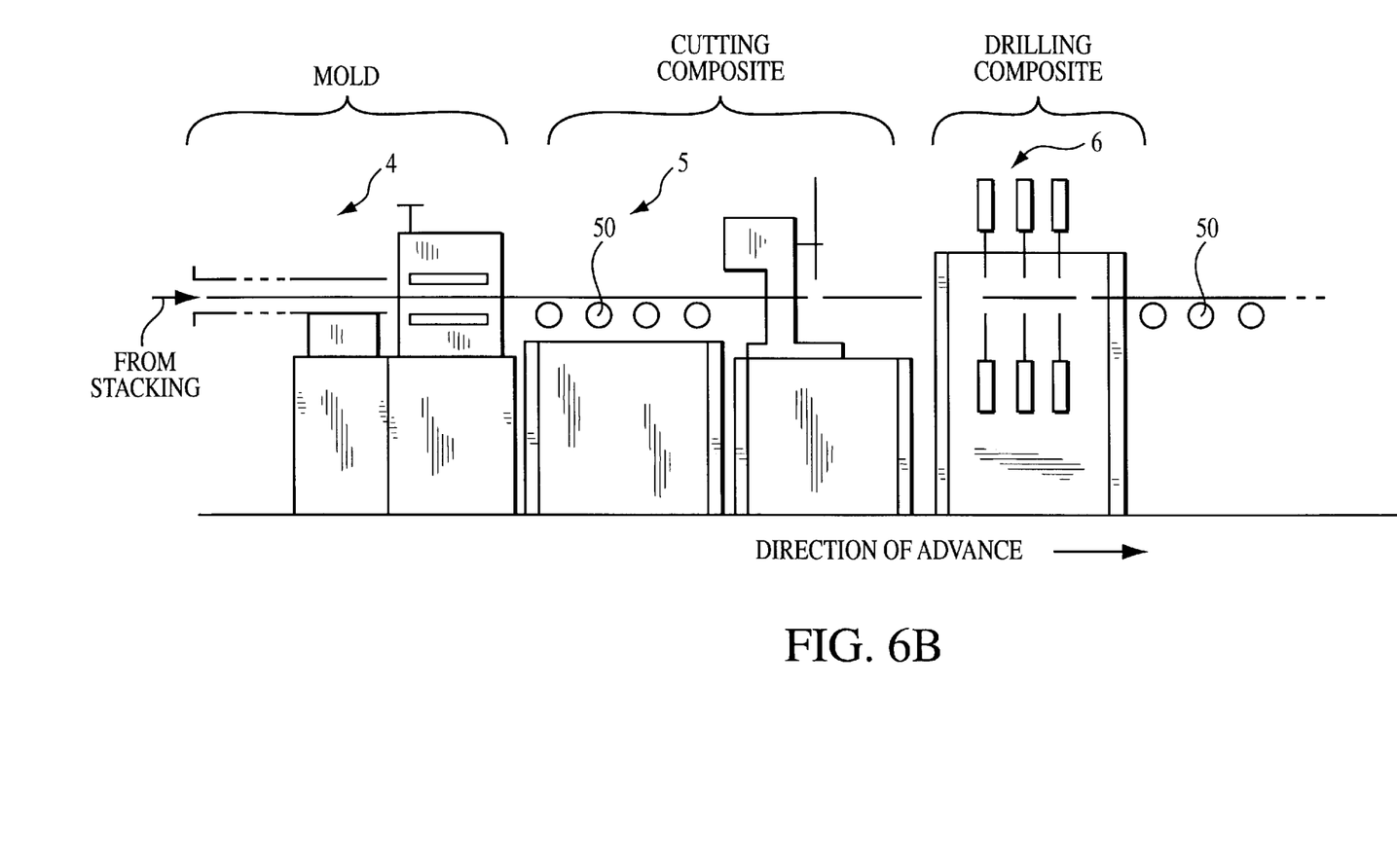

FIGS. 6A and 6B show a preferred embodiment of an apparatus for the production of reinforced composite shapes. Continuous steel rods from, for example, rolls of steel wire (not shown) are fed into a straightening machine 1 where the rods are straightened. Any suitable machine for straightening the rods may be used. However, as discussed above the rods should be straightened with a high degree of accuracy. Preferably, a machine having horizontal rollers 20 and vertical rollers 22 is used because it has been found that such a combination of rollers accurately straightens the steel rods.

The straightened steel rods are then fed to a measuring and cutting machine 2 where they are measured and cut to sizes that are suitable for the reinforced composite shapes that are to be formed. The lengths of the reinforcement elements may vary according to the desired lengths of the reinforced composite shapes. The reinforcement elements are stress relieved and aligned, and can be cut without deformation in the cutting machine 2. Preferably, a hydraulic automatic measuring and cutting machine is used. Such machines are known in the art and, therefore, are not described in detail.

Once the reinforcement elements have been cut, they are carried by a continuous feeder 30 of an orienting and stacking machine 3 to stackers 32 for stacking the cut reinforcement elements one on top of the other. If the reinforced composite shapes to be formed require two stacks of reinforcement elements, as is the case in the reinforced composite shapes of FIGS. 1–3, then two stackers 32 are used as shown in FIG. 6A.

Then rollers (not shown) convey the reinforcement elements toward a mold 4 (see FIG. 6B). The reinforcement elements are guided both horizontally, for example, by pushers and rubber rollers, and vertically, for example, by rollers up and down along the stacked reinforcement elements, so that the orientation of the reinforcement elements is maintained up to the opening into the mold 4.

Figure 8:
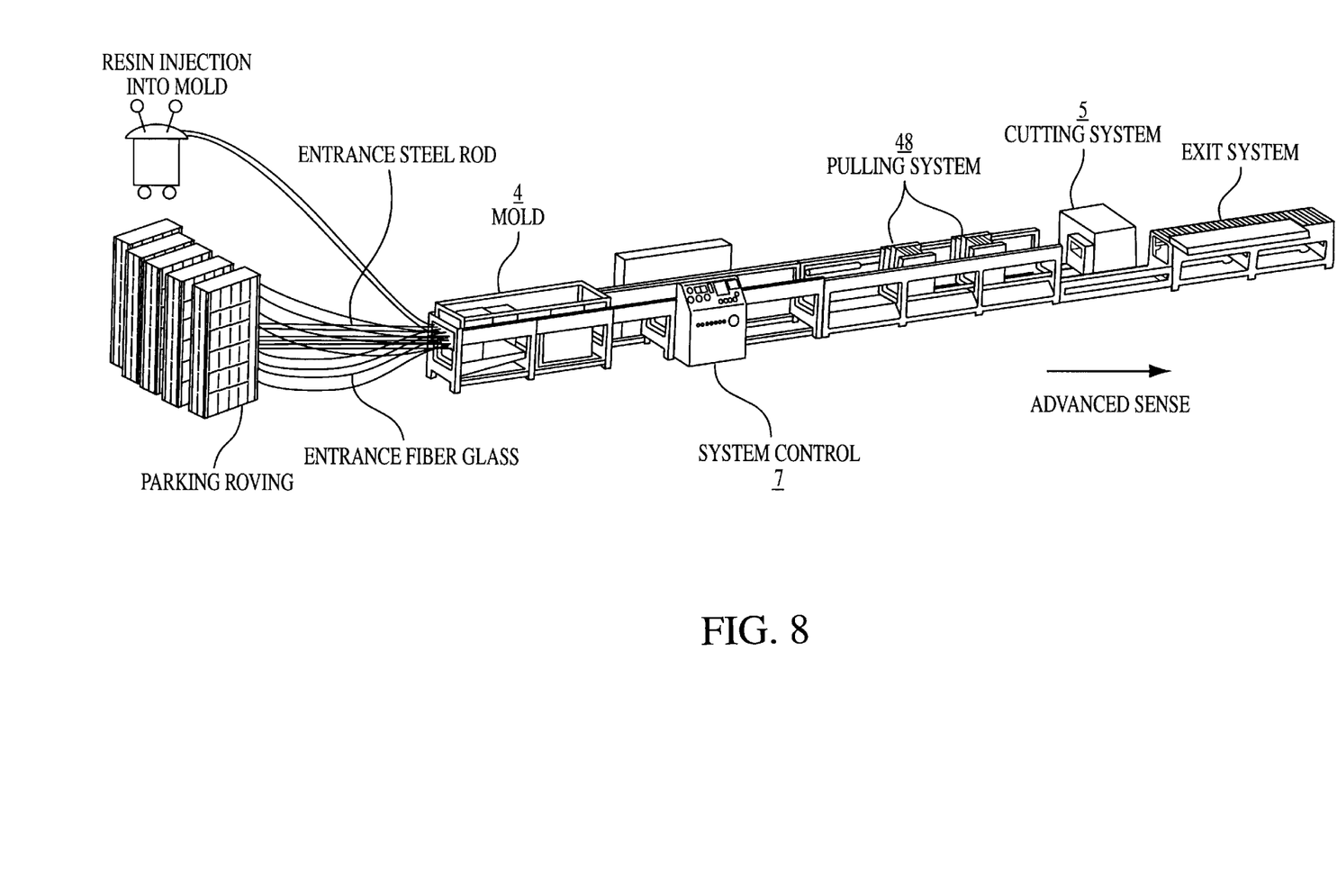
FIG. 8 is another view of the apparatus for manufacturing reinforced composite shapes.

The reinforcement elements, straightened and aligned, are introduced automatically into the mold 4. Preferably, a pultrusion-type mold is used for molding the reinforced composite shapes. FIG. 8 is another view of the system for the pultrusion of reinforced composite shapes.

Referring to FIG. 6B, a cutting machine 5 is used to cut the composite shapes that are formed in the mold 4. A drill 6 or other suitable equipment may be used if the cut reinforced composite shapes are to be drilled or otherwise finished. The composite shapes travel on rollers 50.

The high percentage of steel in the reinforced composite shapes (as discussed above) is preferably provided by a continuous system. To the knowledge of the present inventors, no continuous system now exists for measuring and cutting steel rods and then orienting and stacking them in a predetermined manner for feeding to a molding process.

The various machines are synchronized with each other. An electronic control system 7 may be used to ensure that the feed rate of the reinforcement elements corresponds to the rate of advance of the manufactured composite shapes that are obtained from the mold.

Figure 7A:
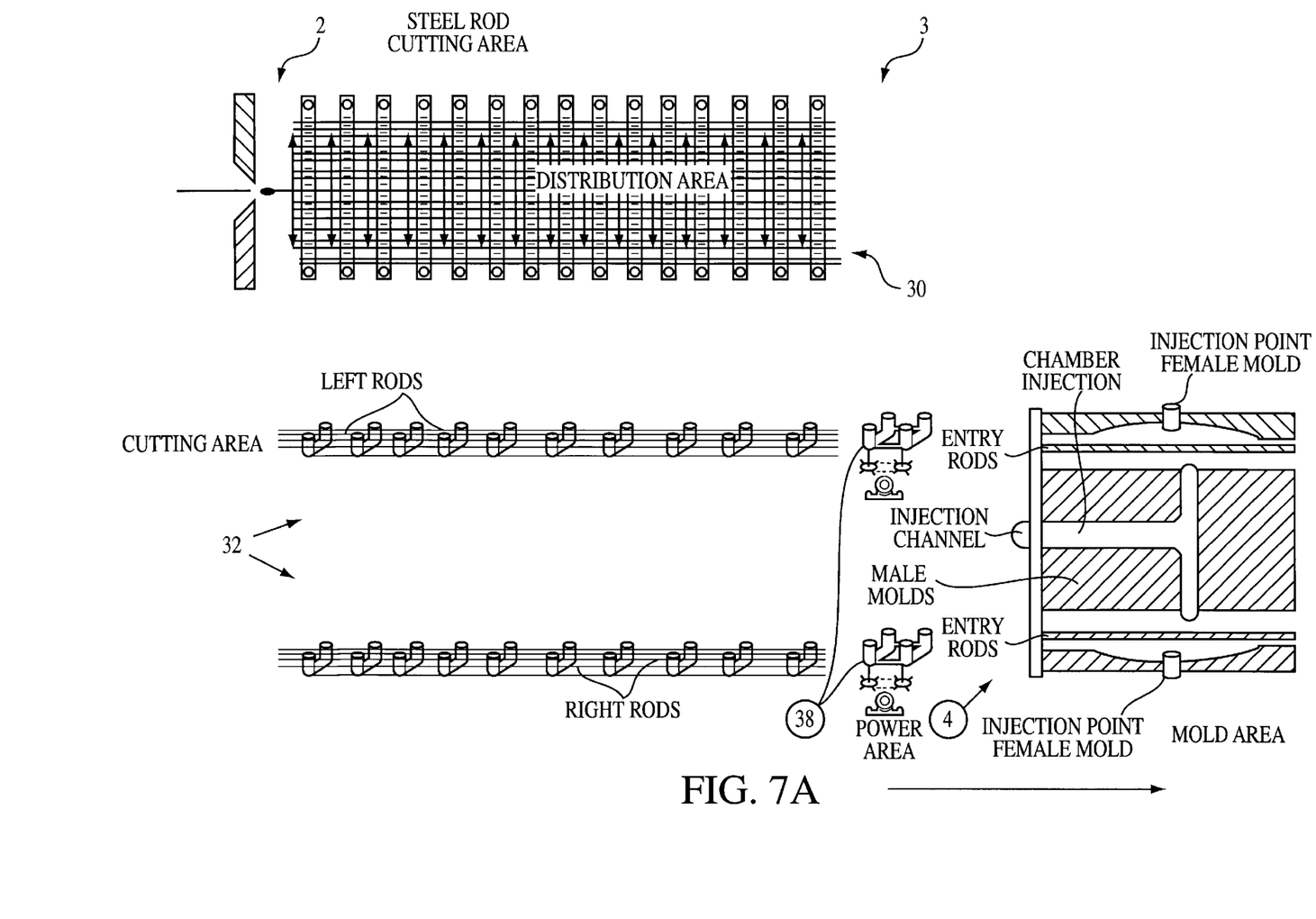
FIGS. 7A and 7B are more detailed views of the orientation and stacking apparatus of FIG. 6A.
Figure 7B:
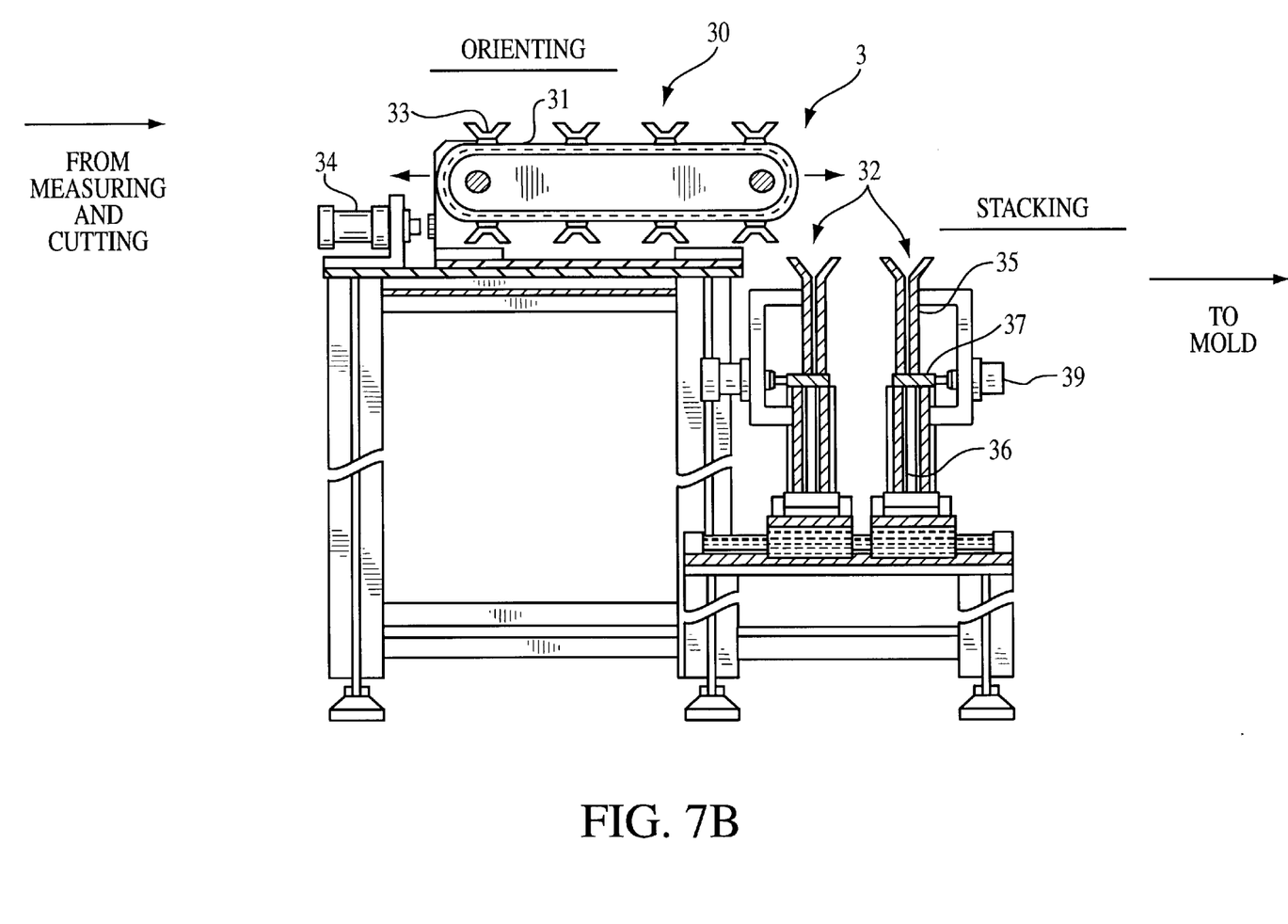

More detailed views of the orienting and stacking machine 3 are shown in FIGS. 7A and 7B. As shown, a continuous feeder 30 includes a continuous belt 31 and receptacles 33 for receiving individual cut reinforcement elements from the automatic measuring and cutting machine 2. The continuous feeder 30 is oriented relative to the stackers 32 such that the reinforcement elements in the receptacles 33 are dropped into chutes 35 of the stackers 32 and the reinforcement elements are stacked in the chutes 35. The feeder 30 is shiftable by a shifting device 34, for example a device having a piston and cylinder, to deposit reinforcement elements into either one of the stackers 32. When the desired number of reinforcement elements in the chutes 35 is reached, a door or closure 37 is opened by another shifting device 39 so that the stacked reinforcement elements automatically drop into lower portions 36 of the stackers 32. Then the lower portions are compressed (by conventional means, not shown) so as to press the elements into vertical planes. Then powered rollers 38 guide the stacks of elements to the mold 4, as seen at the right side of FIG. 7A.

Figure 9A:
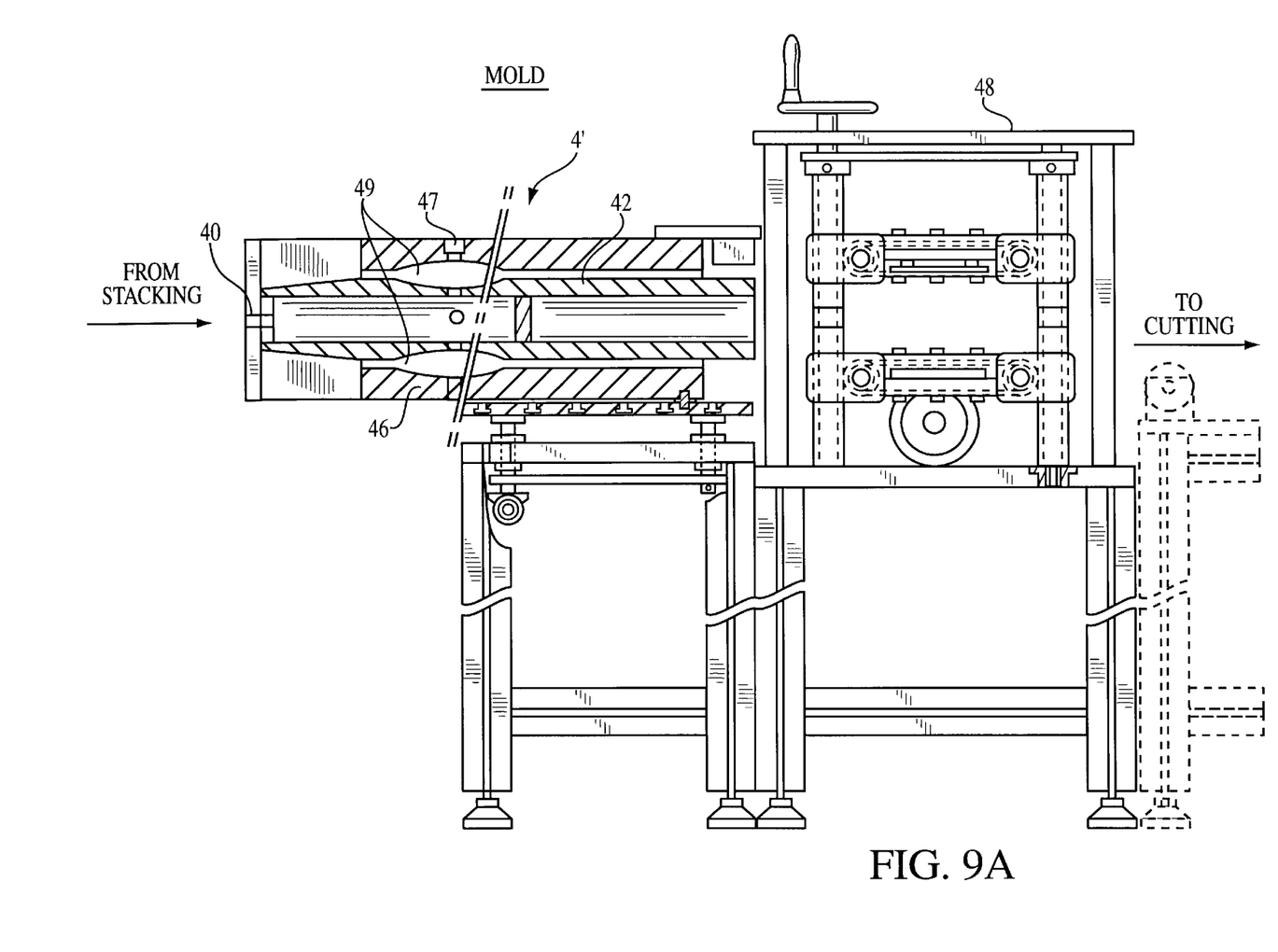
FIGS. 9A and 9B are more detailed views of the mold shown in FIGS. 6B, 7A and 8.
Figure 9B:
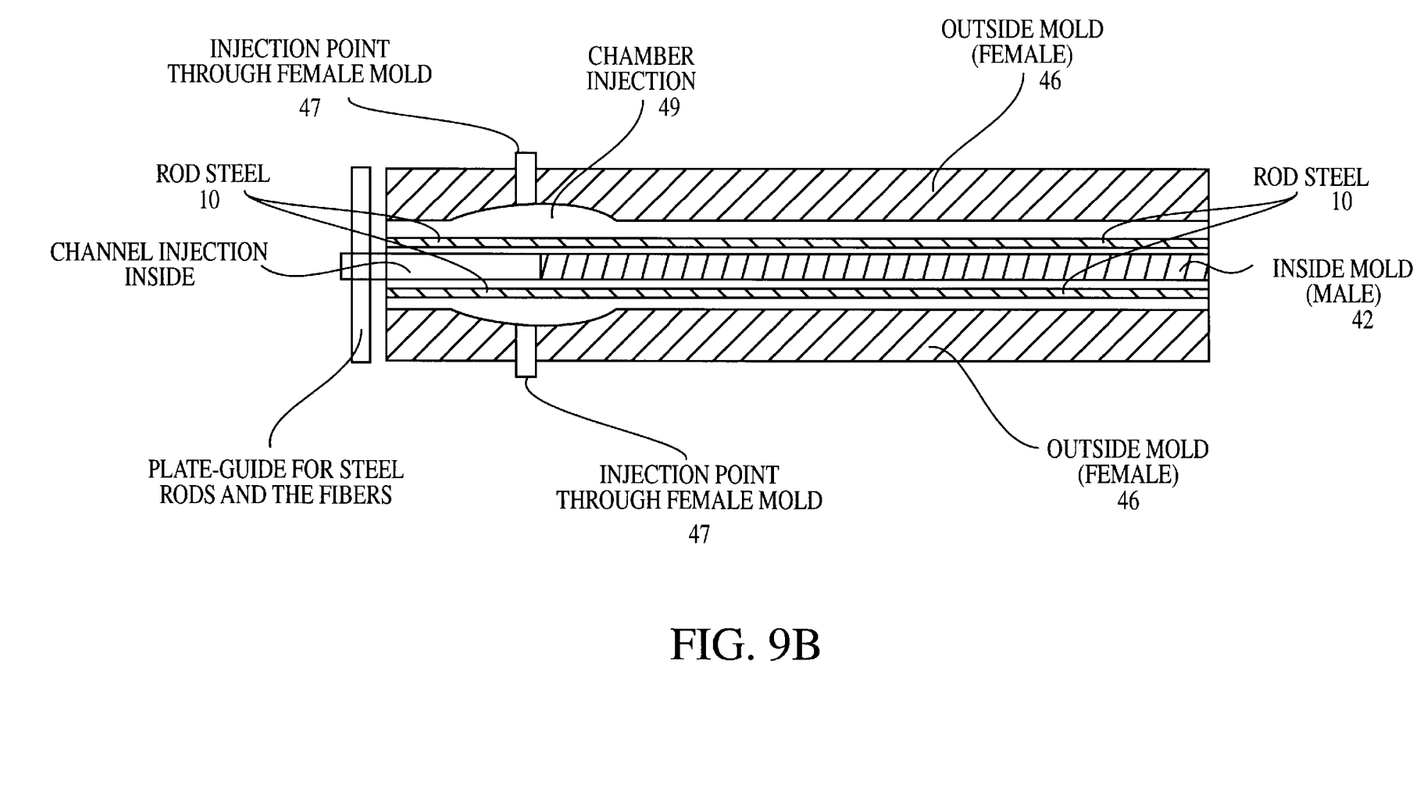

FIGS. 9A and 9B show a preferred mold 4' into which the oriented and stacked reinforcement elements are fed along with reinforcement fibers and resin. The reinforcement elements are introduced into an opening 40 of the mold 4' by wrapping the reinforcement fibers, such as fiberglass, around the stacked and oriented reinforcement elements and then the reinforcement fibers are pulled by a mechanical pulling device 48 to draw the wrapped reinforcement elements into the mold 4'. The reinforcement elements are wrapped in the reinforcement fibers while maintaining the orientation and alignment of the reinforcement elements. The wrapping is tight so as to cover and protect the elements. Therefore, when the reinforcement fibers are then pulled through the mold 4' the reinforcement elements are also drawn into and through the mold 4'.

A guide plate for guiding the steel rods and fibers is shown in FIG. 9B. The guide plate guides the fibers along the steel rods for suitably wrapping the steel rods.

Resin is introduced through the openings 47. The mold 4' includes an inner mold part 42 and a surrounding outer mold part 46. Inlets 47 for the resin are provided through the inner mold part 42 and the outer mold part 46 into the space 49 so that the injected resin surrounds completely the reinforcement elements and fibers in the space 49. The outer mold part 46 of the mold 4' is structured to provide high pressure molding of the reinforced composite shapes.

It is advantageous, in order to obtain adherence between the reinforcement elements and the other materials of the composite, to provide high compression in the mold. Preferably, an injection pressure of 4.5 to 5.5 kg/cm$^2$, more preferably 5 kg/cm$^2$, is applied in the mold. A minimum temperature of about 140° C. is maintained in the mold.

The mechanical pulling device 48 is used to draw the reinforced composite shape that is formed in the chamber 49 out of the mold 4'. Generally, the process by which the reinforced composite shapes are molded is similar to the known pultrusion process.

Figure 10:
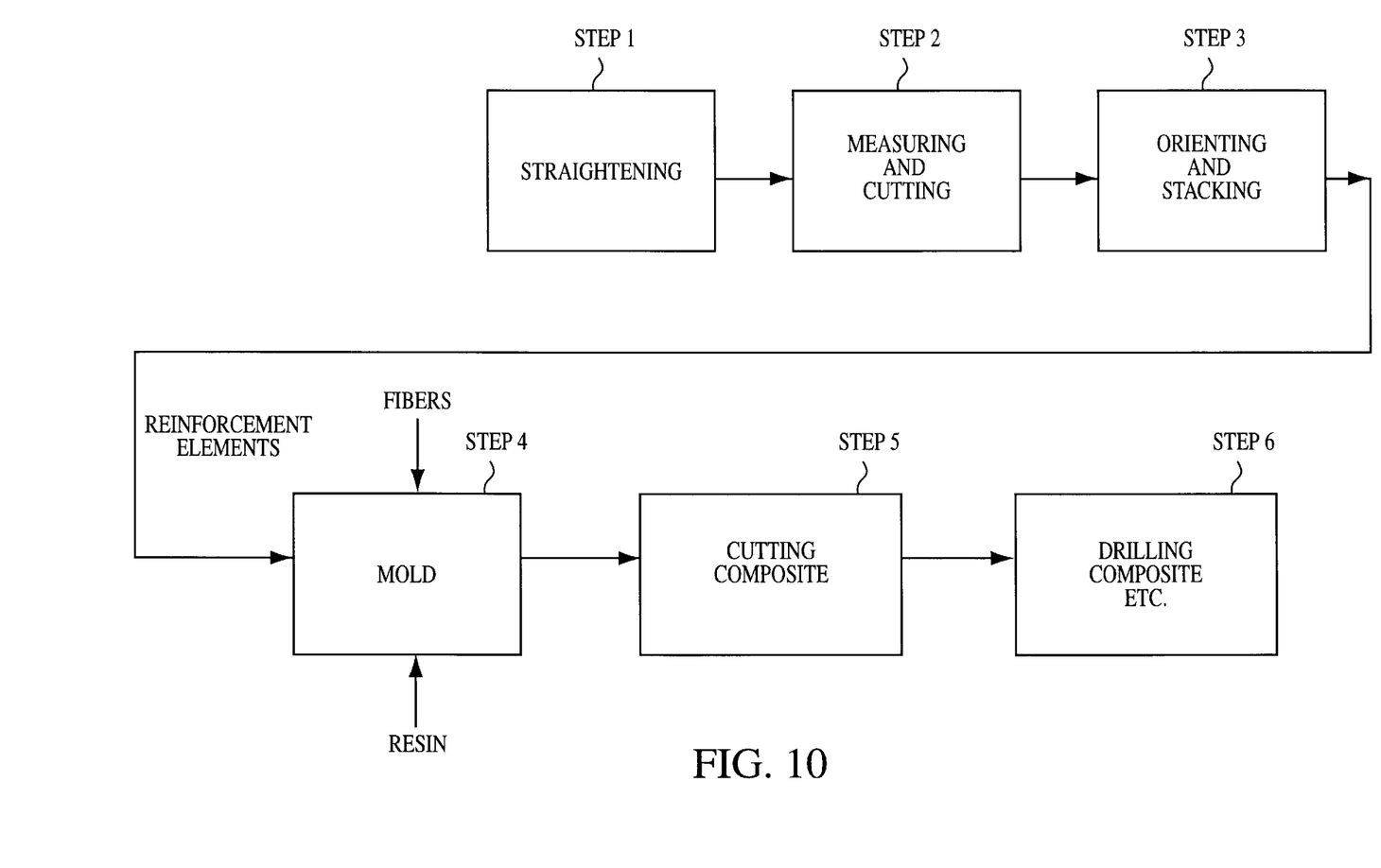
FIG. 10 shows schematically a preferred embodiment of a method for manufacturing reinforced composite shapes.

FIG. 10 shows the steps of a preferred embodiment of a method for manufacturing reinforced composite shapes, in which continuous lengths of reinforcement elements, from rolls of steel rod, for example, are straightened in Step 1, measured and then cut to desired lengths in Step 2 to provide a plurality of separate reinforcement elements. A predetermined number of the steel reinforcement elements are then stacked and oriented in Step 3 into a predetermined arrangement relative to one another.

In Step 1, preferably the reinforcement elements are straightened with a high degree of accuracy so that they can then be accurately oriented and aligned in Step 3.

In Step 4, the reinforcement elements are fed into a mold. Reinforcement fibers and resin are simultaneously fed into the mold in the conventional manner. Advantageously, the desired reinforced composite shapes are obtained in Step 4 by the known pultrusion process.

As discussed above, the operations of straightening and then orienting and stacking the reinforcement elements are particularly important. After these operations, the reinforcement elements are conveyed automatically into position to be deposited in predetermined arrangements into the mold. It is important that the orientation and stacking of the reinforcement elements be accurately maintained when feeding into the mold so that there is substantially no variation in the alignment and orientation of the reinforcement elements.

In Step 5 the reinforced composite shape that is formed in Step 4 is cut to a desired size and in Step 6 the cut reinforced composite shapes may then be drilled or finished in any other manner that is appropriate or desired.

The procedure for obtaining composite shapes allows composite shapes to be manufactured in a continuous manner, with a cross-section that is open or closed, solid or hollow, and even with complex forms and variable cross-sections.

The reinforced composite shapes that are obtained have, for example, the following properties:

1) Approximately only 15% of the weight of comparable steel shapes having similar elastic limit characteristics, and approximately 7% of the weight of materials made from reinforced concrete.
2) Resistance to outside agents, such as the weather and industrial agents.
3) Ease and economy in transportation and assembly.
4) Lower costs in comparison with equivalent steel or concrete shapes.
5) The shapes may be obtained in any color.
6) Very good electrical insulation, since the resins and fibers are non-conductive.

The reinforced composite shapes have an enhanced rigidity, which cannot be obtained in composites formed by any of the known manufacturing processes. It should be noted that any solid shape can be manufactured. The present applicants manufacture reinforced composites in as many as 60 different shapes. These pieces can be up to 17 m long depending on their application, for example, as electricity pylons, bridge girders, construction beams, etc.

The applications of the composite shapes obtained are very wide, including use as posts for electrical distribution lines, forming part of reticulated or triangulated structures, supports or lamps for public lighting, radio antennas, etc.

Although the present invention has been described in relation to particular embodiments thereof, many other variations and modifications and other uses will become apparent to those skilled in the art. The present invention is not limited by the specific disclosure herein, but only by the appended claims.

What is claimed is:

1. A method of producing a reinforced composite shape, comprising the steps of:

cutting and straightening a plurality of lengths of steel rod material to obtain a plurality of steel reinforcement rods;

after said cutting and straightening step, stacking the reinforcement rods in a substantially parallel orientation relative to one another;

introducing the stacked reinforcement rods into a pultrusion mold while maintaining said substantially parallel orientation;

introducing reinforcement fibers into the pultrusion mold along with said reinforcement rods; and pultruding the reinforcement rods and reinforcement fibers in the pultrusion mold and simultaneously embedding the reinforcement rods and reinforcement fibers in resin to form a reinforced composite shape.

2. The method of claim 1, further comprising the step of selecting a steel for the reinforcement rods from steels having an elastic limit of 8500 kg/cm$^2$ and greater.

3. The method of claim 2, wherein the reinforced composite shape is formed with a Young's modulus of the reinforced composite shape of about $9 \times 10^5 - 1.0 \times 10^6$ kg/cm$^2$.

4. The method of claim 2, further comprising the step of selecting said steel from steels having a carbon ratio of 0.40% and greater.

5. The method of claim 4, wherein the carbon ratio of the steel is about 0.60–0.75%.

6. The method of claim 4, wherein the carbon ratio of the steel is about 0.80–0.86% and and the elastic limit of the steel is 132.5 kg/mm$^2$ or greater.

7. The method of claim 1, wherein in said pultruding step, the reinforcement rods are enclosed completely in the resin.

8. The method of claim 1, wherein the reinforced composite shape is formed with the reinforcement rods comprising from about 5% to about 40% of the cross-section of the reinforced composite shape.

9. The method of claim 8, wherein the reinforced composite shape is formed with the reinforcement rods comprising from about 32% to about 35% of the cross-section of the reinforced composite shape.

10. The method of claim 1, further comprising the step of selecting said mold and said relative orientation so that the reinforced composite shape has an open cross-section.

11. The method of claim 1, further comprising the step of selecting said mold and said relative orientation so that the reinforced composite shape has a closed cross-section.

12. The method of claim 1, further comprising the step of selecting said steel rod material so that the steel reinforcement rods are about 6–10 mm in diameter.

13. The method of claim 12, wherein the steel rod material is selected so that the steel reinforcement rods are about 8 mm in diameter.

14. The method of claim 12, further comprising the step of selecting said mold and said relative parallel orientation s o that the reinforcement rods are enclosed completely by the resin.

15. The method of claim 14, wherein the resin is 2.5 mm thick or greater.

16. The method of claim 1, further comprising the step of selecting a steel for the reinforcement rods from steels having an elastic limit of 5,500 kg/cm$^2$ and greater.

17. The method of claim 1, further comprising the step of selecting a steel for the reinforcement rods from steels having an elastic limit of 2,750 kg/cm$^2$ and greater.

18. The method of claim 1, wherein the reinforcement fibers are made of material selected from the group consisting of chopped strand mat, continuous mat, roving glass, woven equilibrated (0° to 90°), web woven 80° to 90°, surface veil, and combinations of carbon and aramid with glass fibers.

19. The method of claim 12, wherein the reinforcement fibers are made of material selected from the group consisting of chopped strand mat, continuous mat, roving glass, woven equilibrated (0° to 90°), web woven 80° to 90°, surface veil, and combinations of carbon and aramid with glass fibers.

* * * * *